(12) United States Patent
Wu et al.

(10) Patent No.: US 10,582,452 B2
(45) Date of Patent: Mar. 3, 2020

(54) TIMER HANDLING IN COMMUNICATIONS (71) Applicant: Nokia Solutions and Networks Oy, Espoo (FI)

(72) Inventors: Chunli Wu, Beijing (CN); Yanji Zhang, Beijing (CN); Yuantao Zhang, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/761,196

(22) PCT Filed: Sep. 24, 2015

(86) PCT No.: PCT/CN2015/090493
§ 371 (c)(1),
(2) Date: Mar. 19, 2018

(87) PCT Pub. No.: WO2017/049517
PCT Pub. Date: Mar. 30, 2017

(65) Prior Publication Data
US 2018/0262989 A1    Sep. 13, 2018

(51) Int. Cl.
*H04J 3/06*    (2006.01)
*H04W 52/02*    (2009.01)
*H04W 76/28*    (2018.01)

(52) U.S. Cl.
CPC ... *H04W 52/0229* (2013.01); *H04W 52/0216* (2013.01); *H04W 76/28* (2018.02);
(Continued)

(58) Field of Classification Search
CPC ............. H04W 52/0225; H04W 76/28; H04W 52/0229; H04W 76/048; H04W 28/18;
(Continued)

(56) References Cited

U.S. PATENT DOCUMENTS

| 2013/0223307 A1 | 8/2013 | Ohlsson et al. ............... 370/311 |
| 2014/0098761 A1* | 4/2014 | Lee ..................... H04W 74/006 370/329 |

(Continued)

FOREIGN PATENT DOCUMENTS

| WO | WO 2011102644 A2 | 8/2011 |
| WO | WO 2014181997 A1 | 11/2014 |
| WO | WO 2015062470 A1 | 5/2015 |

OTHER PUBLICATIONS

Intel Corporation; "Timer impact for Release-13 low complexity UEs and enhanced coverage"; R2-153280; 3GPP TSG RAN WG2 Meeting #91; Beijing, China; Aug. 24-28, 2015; whole document (6 pages).

(Continued)

*Primary Examiner* — Hanh N Nguyen
(74) *Attorney, Agent, or Firm* — Harrington & Smith (57) ABSTRACT

A method and an apparatus are disclosed, wherein a configuration of at least one channel monitoring related timer is defined such that the effective value of the channel monitoring related timer is mapped to a coverage enhancement CE level. The apparatus performs monitoring of downlink control channel sub-frames transmitted from a network element to a terminal device, according to said configuration of the channel monitoring related timer.

17 Claims, 6 Drawing Sheets

(52) U.S. Cl.
CPC ...... *Y02D 70/1242* (2018.01); *Y02D 70/1262* (2018.01); *Y02D 70/1264* (2018.01); *Y02D 70/21* (2018.01); *Y02D 70/24* (2018.01)

(58) Field of Classification Search
CPC ......... H04W 52/0235; H04W 52/0248; H04W 52/0251; H04W 72/042; H04W 52/0216
See application file for complete search history.

(56) References Cited

U.S. PATENT DOCUMENTS

| | | | |
|---|---|---|---|
| 2015/0029923 A1* | 1/2015 | Xu | H04W 76/28 370/311 |
| 2016/0242162 A1* | 8/2016 | Yao | H04W 24/00 |
| 2016/0353440 A1* | 12/2016 | Lee | H04W 4/70 |
| 2017/0150477 A1* | 5/2017 | Du | H04W 68/005 |
| 2018/0249440 A1* | 8/2018 | Zhang | H04W 76/45 |

OTHER PUBLICATIONS

Alcatel-Lucent et al.; "Coverage enhancement for (E)PDCCH"; R1-140154; 3GPP TSG-RAN WG1 Meeting #76; Prague, Czech Republic; Feb. 10-14, 2014; whole document (6 pages).
R2-153485, "Consideration on random access for R13 eMTC", CATT, 3GPP TSG RAN WG2 Meeting #91, Aug. 2015, 5 pgs.
R2-153466, "DRX enhancements for Rel-13 low complexity MTC", Samsung, 3GPP TSG RAN WG2 #91, Aug. 2015, 4 pgs.
R2-140073, "Impact Analysis of Extended Coverage", CATT, 3GPP TSG RAN WG2 Meeting #85, Feb. 2014, 6 pgs.

* cited by examiner

TIMER HANDLING IN COMMUNICATIONS

RELATED APPLICATION

This application was originally filed as PCT Application No. PCT/CN2015/090493 filed Sep. 24, 2015.

TECHNICAL FIELD

The invention relates to communications.

BACKGROUND

Discontinuous reception (DRX) refers to saving battery power of a wireless terminal device by periodically and automatically switching the terminal device receiver on and off. When the terminal device turns its receiver off the device enters a low power state.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following, the invention will be described in greater detail by means of preferred embodiments with reference to the accompanying drawings, in which.

DETAILED DESCRIPTION OF SOME EMBODIMENTS

The following abbreviations that may be found in the specification and/or the drawing figures are defined as The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: universal mobile telecommunication system (UMTS, 3G) based on basic wideband-code division multiple access (W-CDMA), high-speed packet access (HSPA), long term evolution (LTE), LTE-advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input-multiple output (MIMO) antennas, many more base stations or nodes than the current network deployments of LTE (a so-called small cell concept), including macro sites operating in cooperation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be nonexistent. Some other technology advancements probably to be used are software-defined networking (SDN), big data, and all-IP, which may change the way networks are being constructed and managed.

Figure 1:
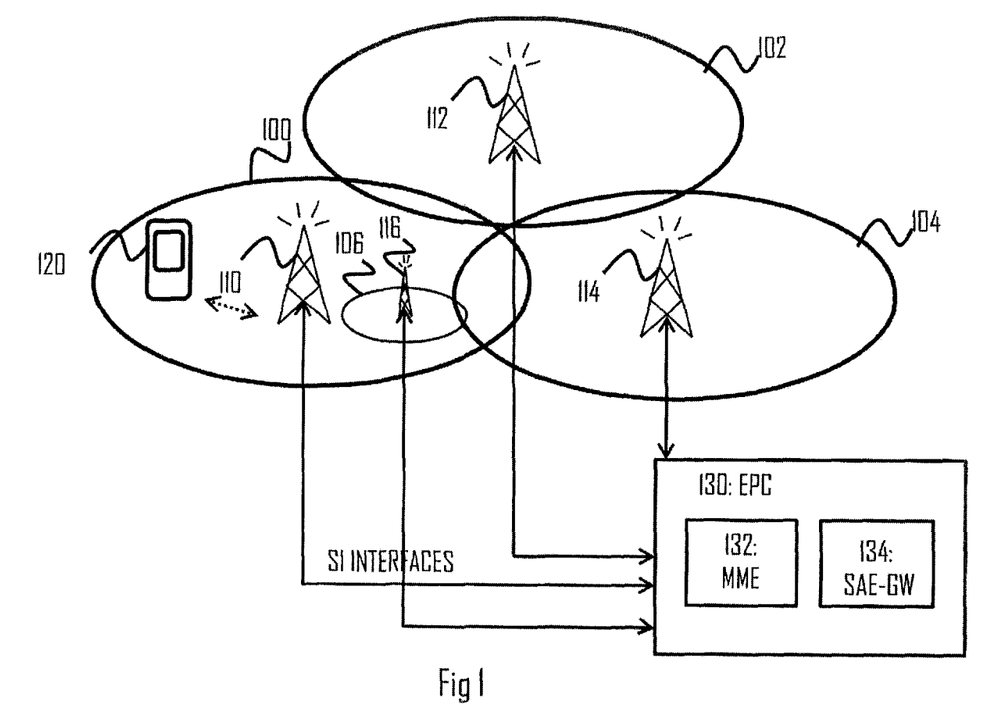
FIG. 1 illustrates a wireless communication system to which embodiments of the invention may be applied.

FIG. 1 illustrates an example of a cellular communication system to which embodiments of the invention may be applied. Cellular radio communication networks, such as the long term evolution (LTE), the LTE-advanced (LTE-A) of the 3rd generation partnership project (3GPP), or the predicted future 5G solutions, are typically composed of at least one network element, such as a network element 110, providing a cell 100. Each cell may be, e.g. a macro cell, a micro cell, femto, or a pico cell, for example. The network element 110 may be an evolved node-B (eNB) as in the LTE and LTE-A, or any other apparatus capable of controlling radio communication and managing radio resources within a cell. For 5G solutions, the implementation may be similar to LTE-A, as described above. The network element 110 may be called a base station or an access node. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the Internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network element 110 under whose control area the sub-cell is provided. The network element 110 and the other network elements 112 to 116 may support dual connectivity (DC) in which the terminal device 120 has established multiple connections with cells associated with a master eNB network element and a secondary eNB network element.

The network element 110 may employ carrier aggregation in which the terminal device 120 is allocated with resources from a plurality of component carriers that may be on contiguous frequency bands or on non-contiguous frequency bands. One network element 110 may provide one component carrier, e.g. a primary component carrier, while another network element 116 may provide another component carrier, e.g. a secondary component carrier. The network element 110 operating the primary component carrier may carry out scheduling of resources on all component carriers, or each network element 110, 116 may control scheduling of the component carrier it operates. Alternatively network element 110 may provide one component carrier, e.g. a primary component carrier, as well as another component carrier, e.g. a secondary component carrier.

In the case of multiple eNBs in the communication network, the eNBs may be connected to each other with an X2 interface as specified in LTE. Other communication methods between the network elements may also be possible. The network elements 110 to 116 may be further connected via an S1 interface to an evolved packet core (EPC) 130, more specifically to a mobility management entity (MME) 132 and to a system architecture evolution gateway (SAE-GW) 134.

The radio system of FIG. 1 may support machine type communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. The at least one terminal device 120 may also comprise another MTC capable device, such as a sensor device providing position, acceleration and/or temperature information to name a few examples.

3GPP LTE Rel-13 involves LTE physical layer enhancements for machine type communication (MTC). A Rel-13 MTC user equipment (UE) only needs to support 1.4 MHz (i.e. only 6 PRB pairs) radio frequency bandwidth in downlink and uplink within any system bandwidth. Rel-13 MTC specifies techniques that are able to achieve a network coverage improvement of 15 dB for frequency division duplex (FDD) where MTC devices are deployed in challenging locations, e.g. deep inside buildings. These techniques may include, for example, sub-frame bundling techniques with HARQ for physical data channels, resource allocation using M-PDCCH with cross-sub-frame scheduling with repetition, etc. The amount of coverage enhancement (CE) may be configured per cell, per user equipment, per channel and/or per group of channels. Rel-13 MTC also provides power consumption reduction schemes, both in normal network coverage and enhanced network coverage, for ultra-long battery life.

RRC/MAC timers such as DRX timers, RAR window, contention resolution timer, PHR/BSR/SR related timers, SCell deactivation etc. are in the order of sub-frames/frame. With tens or hundreds of PDCCH repetitions, these timers do not even provide eNB with one scheduling opportunity. Therefore a legacy way of handling these timers is not necessarily applicable to MTC.

For example, when configured with DRX, UE monitors a number of consecutive PDCCH sub-frames defined by timers such as onDurationTimer, drx-InactivityTimer, etc. Most of the parameters are configured as number of sub-frames, e.g. psf1, psf2 means 1 sub-frame, 2 sub-frames, etc.

| | |
|---|---|
| onDurationTimer | ENUMERATED { psf1, psf2, psf3, psf4, psf5, psf6, psf8, psf10, psf20, psf30, psf40, psf50, psf60, psf80, psf100, psf200}, |
| drx-InactivityTimer | ENUMERATED { psf1, psf2, psf3, psf4, psf5, psf6, psf8, psf10, psf20, psf30, psf40, psf50, psf60, psf80, psf100, psf200, psf300, psf500, psf750, psf1280, psf1920, psf2560, p5f0-v1020, spare9, spare8, spare7, spare6, spare5, spare4, spare3, spare2, spare1}, |
| drx-RetransmissionTimer | ENUMERATED { psf1, psf2, psf4, psf6, psf8, psf16, psf24, psf33}, |
| longDRX-CycleStartOffset | CHOICE { |
| sf10 | INTEGER(0..9), |
| sf20 | INTEGER(0..19), |
| sf32 | INTEGER(0..31), |
| sf40 | INTEGER(0..39), |
| sf64 | INTEGER(0..63), |
| sf80 | INTEGER(0..79), |
| sf128 | INTEGER(0..127), |
| sf160 | INTEGER(0..159), |
| sf256 | INTEGER(0..255), |
| sf320 | INTEGER(0..319), |
| sf512 | INTEGER(0..511), |
| sf640 | INTEGER(0..639), |
| sf1024 | INTEGER(0..1023), |
| sf1280 | INTEGER(0..1279), |
| sf2048 | INTEGER(0..2047), |
| sf2560 | INTEGER(0..2559) |
| }, | |
| shortDRX | SEQUENCE { |
| shortDRX-Cycle | ENUMERATED { sf2, sf5, sf8, sf10, sf16, sf20, sf32, sf40, sf64, sf80, sf128, sf160, sf256, sf320, sf512, sf640}, |
| drxShortCycleTimer | INTEGER (1..16) |
| } | OPTIONAL     -- Need OR |

The value range of the DRX parameters may be extended with much longer values, and UE may be reconfigured whenever required, or DRX may even be switched off altogether. However, these lead to increased power consumption in UE and increased RRC signalling.

Figure 2:
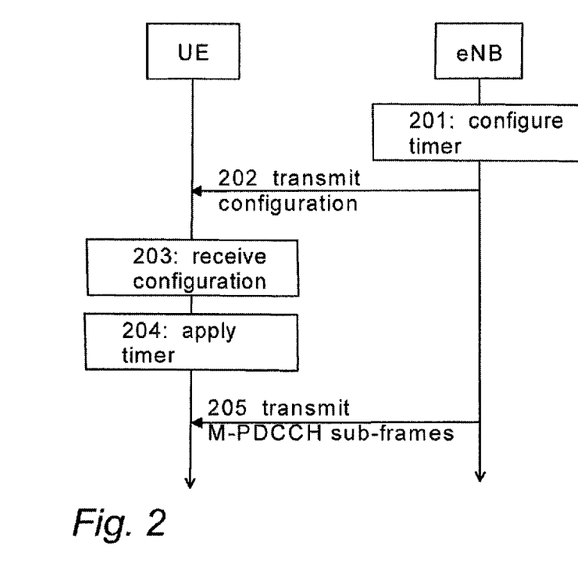
FIGS. 2 and 3 illustrate signalling diagrams of a procedure for timer handling according to an embodiment of the invention.
Figure 3:
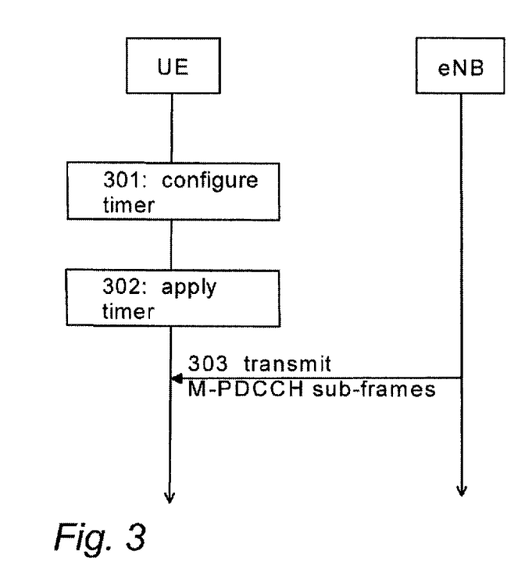

FIGS. 2 and 3 illustrate embodiments for downlink control channel (PDCCH, M-PDCCH and/or E-PDCCH) monitoring related timer handling between a terminal device 120 and network element of a cellular communication system, e.g. a network element 110.

Referring to FIG. 2, the network element, such as network element 110, defines (block 201) for the terminal device (such as terminal device 120), a configuration of at least one downlink control channel monitoring related timer such that the effective value of the downlink control channel monitoring related timer is mapped to a coverage enhancement CE level. In block 202, the network element causes transmission of signalling from the network element to the terminal device, the signalling indicating the defined configuration of the downlink control channel monitoring related timer. In block 203, the terminal device acquires from the network element the signalling indicating the configuration of the downlink control channel monitoring related timer such that the effective value of the downlink control channel monitoring related timer is mapped to a coverage enhancement CE level. In block 204, the terminal device performs monitoring of (i.e. listens to) downlink control channel subframes transmitted from the network element, according to said configuration of the downlink control channel monitoring related timer. In block 205, the network element performs transmission of downlink control channel sub-frames to the terminal device.

Referring to FIG. 3 the terminal device defines (block 301) a configuration of at least one downlink control channel monitoring related timer such that the effective value of the downlink control channel monitoring related timer is mapped to a coverage enhancement CE level. In block 302, the terminal device performs monitoring of (i.e. listens to) downlink control channel subframes transmitted from the network element, according to said configuration of the downlink control channel monitoring related timer. In block 303 the network element performs transmission of downlink control channel sub-frames to the terminal device.

Thus, the effective value (such as the DRX parameters) of the downlink control channel monitoring related timer depends on the present coverage enhancement CE level, and the terminal device is configured to monitor (only) those downlink control channel sub-frames specified by the timer (and be in a sleep/inactive mode during other sub-frames (e.g. when the timer is expired)).

In an embodiment, the coverage enhancement CE level is calculated in the terminal device based on the amount of downlink control channel repetitions configured for coverage enhancement CE. For initial RACH, the CE level is determined based on UE measurement of RSRP, and UE is configured to decide the corresponding repetition level based on broadcast information for each CE level. Then UE is configured to calculate the RAR window and/or contention resolution timers based on those. Each coverage enhancement CE level is associated with the corresponding amount of downlink control channel repetitions.

In an embodiment, the coverage enhancement CE level is calculated in the network element and transmitted from the network element to the terminal device. For other transmission/reception other than RACH, the coverage level is configured by eNB. The coverage level may be configured by eNB when UE is in a connected mode.

In an embodiment, predefined weight factors associated with each coverage enhancement CE level are utilized in the terminal device for defining the configuration of the downlink control channel monitoring related timer.

In an embodiment, predefined weight factors associated with each coverage enhancement CE level are signalled from the network element to the terminal device to be utilized for defining the configuration of the downlink control channel monitoring related timer.

In an embodiment, the downlink control channel monitoring related timer is extended by multiplying with the weight factor associated with the CE coverage enhancement level, by adding new parameter values, or by scaling an original parameter value to the number of downlink control channel repetitions.

In an embodiment, the downlink control channel monitoring related timer and downlink control channel sub-frame transmission are aligned such that the sub-frame number of a downlink control channel transmission starting sub-frame is defined based on an equation of:

$$[(SFN*10)+\text{sub-frame number}]\,\text{modulo}(MP\_R\_Period)=MP\_O\_\text{Offset},$$

where SFN is a system frame number of a frame where the starting sub-frame occurs, MP_R_Period is an downlink control channel repetition period or the amount of downlink control channel repetitions, and MP_O_Offset is an downlink control channel occasion offset from 0 to the maximum MP_R_Period−1.

In an embodiment, the downlink control channel monitoring related timer is one or more of a DRX timer, onDurationTimer, RAR window, contention resolution timer, mac-ContentionResolutionTimer, raResponseWindowSize, longDRX-CycleStartOffsetlongDRX-Cycle, drxStartOffset, shortDRX-Cycle, drx-InactivityTimer and drx-RetransmissionTimer.

In an embodiment, the downlink control channel comprises PDCCH, M-PDCCH and/or E-PDCCH. However, instead of or in addition to downlink control channel (PDCCH, M-PDCCH, E-PDCCH), an embodiment is also applicable to any other physical (or higher) layer, such as PUCCH, M-PUCCH, EPUCCH, PDSCH and/or PUSCH.

Instead of or in addition to downlink control channel (PDCCH, M-PDCCH, E-PDCCH) related timers, an embodiment is also applicable to any other physical (or higher) layer related timers, such as PUCCH, M-PUCCH, E-PUCCH, PDSCH and/or PUSCH related timers.

Figure 5:
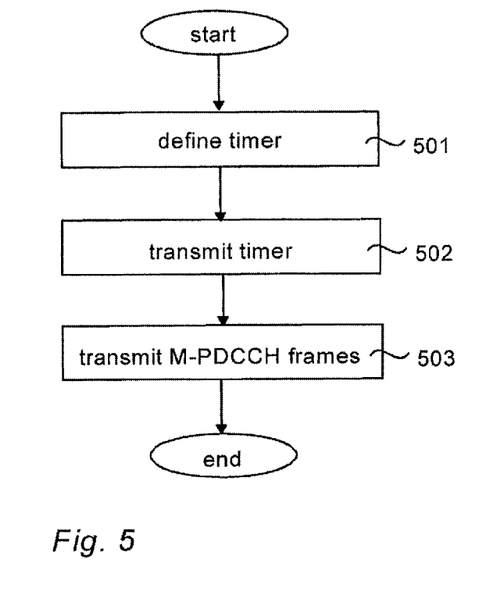
FIGS. 5 and 6 illustrate processes for timer handling according to some embodiments of the invention.
Figure 6:
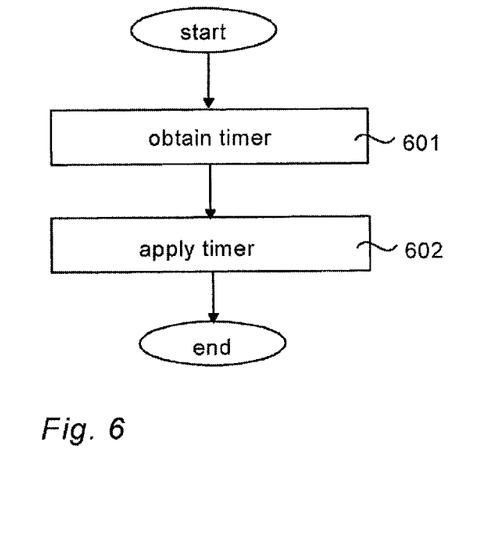

FIGS. 5 and 6 illustrate exemplary processes for downlink control channel (PDCCH, M-PDCCH and/or E-PDCCH) monitoring related timer handling between a terminal device 120 and network element of a cellular communication system, e.g. a network element 110.

Referring to FIG. 5, the network element, such as network element 110, defines (block 501) for the terminal device (such as terminal device 120), a configuration of at least one downlink control channel monitoring related timer such that the effective value of the downlink control channel monitoring related timer is mapped to a coverage enhancement CE level. In block 502, the network element causes transmission of signalling from the network element to the terminal device, the signalling indicating the defined configuration of the downlink control channel monitoring related timer. In block 503, the network element performs transmission of downlink control channel sub-frames.

Referring to FIG. 6 the terminal device defines (or acquires from the network element) (block 601) a configuration of at least one downlink control channel monitoring related timer such that the effective value of the downlink control channel monitoring related timer is mapped to a coverage enhancement CE level. In block 602, the terminal device applies the timer by performing monitoring of the downlink control channel sub-frames transmitted from the network element, according to said configuration of the downlink control channel monitoring related timer.

In an embodiment, an effective value of a downlink control channel monitoring related timer is linked to a coverage enhancement (CE) level. Thus the effective value of the parameters (e.g. DRX parameters) automatically follows the coverage enhancement level, which allows the value range of the parameters to remain the same in the specifications.

In an embodiment, the coverage enhancement level may be measured by means of the amount of repetition being used (for instance, by the number of M-PDCCH repetitions). The CE level may also be defined and signalled between UE and eNB. One option is to predefine weight factors associated with each CE level or signal the weight factors associated with each CE level from eNB to UE, which may be applied to extend the existing parameters but maintain the same value in the specifications. For example, weight factor 10 may be mapped to CE level 1, weight factor 20 may be mapped to CE level 2, etc, wherein UE knows the weight factor based on the existing CE level.

For example, an RRC configuration giving an onDurationTimer of 2 ms means that in a normal coverage, 2 ms is used for the onDurationTimer, while with 20 repetitions configured for an extended coverage, 40 ms is then used. Same occurs for the other timers related to the downlink control channel monitoring, e.g. RAR window and contention resolution timer etc. In case of the weight factor, the timer may be extended to 2 ms multiplied by the CE level associated weight factor.

In an embodiment, UL transmission related timers, e.g. PHR/BSR/SR related timers, are to ensure enough UL transmission repetition. New values may be added, or the original value scaling to the number of repetitions may be applied (or to the weight factor predefined or signalled between UE and eNB).

The deactivation timer for SCell deactivation currently has parameter values of rf2, rf4, rf8, rf16, rf32, rf64, rf128. The first few values are not applicable if UE needs tens or hundreds of sub-frames to decode the downlink control channel. In an embodiment, new values may be added or the original value scaling to the number of repetitions may be applied (or original value scaling to the weight factor predefined or signalled between UE and eNB).

Other timers such as the time alignment timer do not depend on the CE levels.

Figure 4:
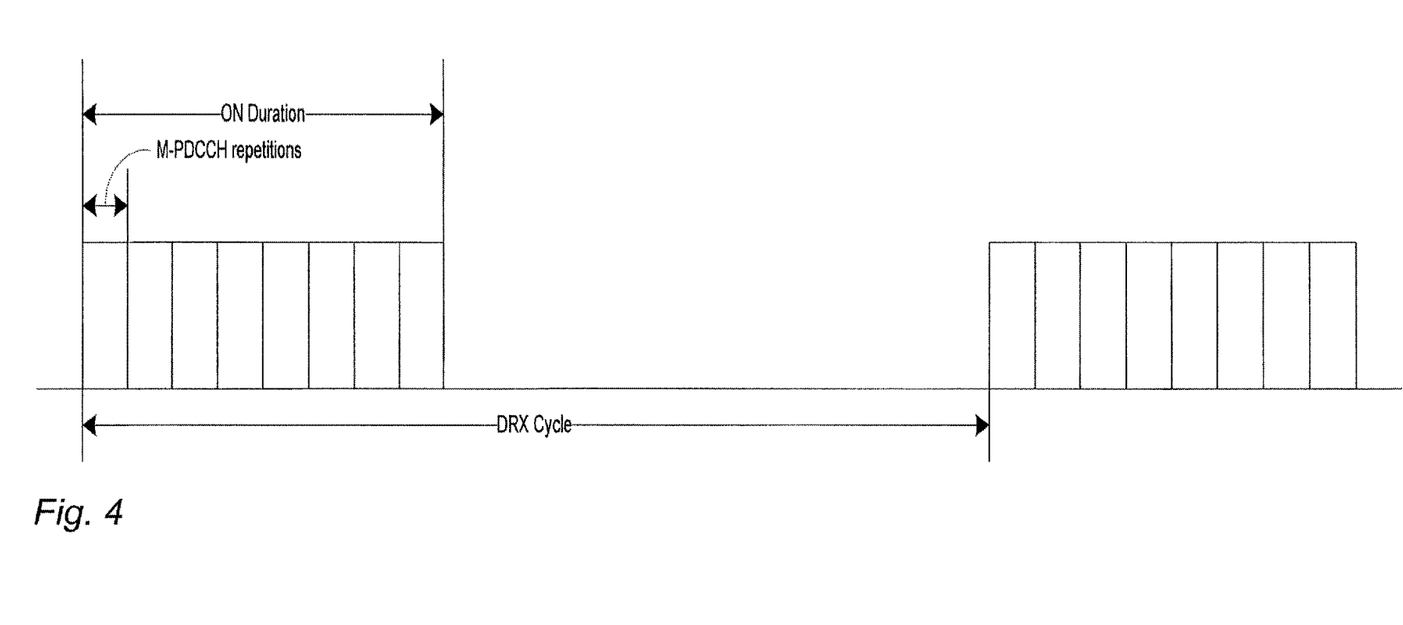
FIG. 4 illustrates aligned M-PDCCH transmission and DRX configuration.

To optimise UE power consumption, it is desirable that the DRX configuration and the M-PDCCH transmission configuration are aligned as much as possible. FIG. 4 illustrates aligned M-PDCCH transmission and DRX configuration.

An embodiment discloses a M-PDCCH configuration where M-PDCCH transmission starts from [(SFN*10)+subframe number] modulo (MP_R_Period)=MP_O_Offset where SFN is the system frame number (SFN) of the frame where the starting sub-frame occurs. MP_R_Period is the M-PDCCH repetition period or the amount of downlink control channel repetitions (sf10, sf20, . . . , sfX) (sf=1 sub-frame, sf10=10 sub-frames, . . . , sfX=X subframes). MP⁺ O_Offset is the M-PDCCH occasion offset (from 0 to the maximum MP_R⁺ Period−1).

Thus the downlink control channel monitoring related parameters follow the CE level (e.g. DRX parameters, RAR window, contention resolution timer etc.), possibly reducing the need for frequent RRC signalling.

When UE is configured with the M-PDCCH repetition, the relevant DRX timer values are specified as the number of M-PDCCH repetitions instead of sub-frames; e.g. value 2 means "2*the number of M-PDCCH repetitions" M-PDCCH-sub-frames.

The starting sub-frame of M-PDCCH for UE may be configured as on top of the M-PDCCH design. The starting sub-frame of M-PDCCH satisfies the following equation: [(SFN*10)+subframe number] modulo (MP_R_Period)= MP_O_Offset. SFN is the system frame number of the frame where the starting sub-frame occurs. MP_R_Period is the M-PDCCH repetition period or number of M-PDCCH repetitions (sf10, sf20, sfX) (sf=1 sub-frame, sf10=10 sub-frames, . . . , sfX=X sub-frames). MP_O_Offset is the M-PDCCH occasion offset (from 0 to the maximum MP_R_Period−1). The proposed M-PDCCH configuration enables the possibility of alignment between DRX onDuration and M-PDCCH transmission. For example, eNB may configured to implement the value of shortDRX-Cycle to be a multiple of MP_R_Period and align MP_O_Offset with drxStartOffset as much as possible.

The new parameters utilized for M-PDCCH occasion derivation may be defined as new information elements in system information. MP_R_Period is the M-PDCCH repetition period or number of M-PDCCH repetitions (sf10, sf20, . . . , sfX) (sf=1 sub-frame, sf10=10 sub-frames, . . . , sfX=X sub-frames). MP_O_Offset is the M-PDCCH occasion offset (from 0 to the maximum MP_R_Period−1). The derivation of the specific system frame and sub-frame for the M-PDCCH occasion may be defined. The M-PDCCH transmission (the starting sub-frame) starts from [(SFN*10)+subframe number] modulo (MP_R_Period)=MP_O_Offset. There is no need to change ASN.1 for the DRX configuration, but the field description may be modified as follows:

| | |
|---|---|
| onDurationTimer | ENUMERATED { psf1, psf2, psf3, psf4, psf5, psf6, psf8, psf10, psf20, psf30, psf40, psf50, psf60, psf80, psf100, psf200 }, |
| drx-InactivityTimer | ENUMERATED { psf1, psf2, psf3, psf4, psf5, psf6, psf8, psf10, psf20, psf30, psf40, psf50, psf60, p5f80, psf100, psf200, psf300, psf500, psf750, ps61280, psf1920, psf2560, psf0-v1020, spare9, spare8, spare7, spare6, spare5, spare4, spare3, spare2, spare1 }, |
| drx-RetransmissionTimer | ENUMERATED { psf1, psf2, psf4, psf6, psf8, psf16, psf24, psf33 }, |
| longDRX-CycleStartOffset | CHOICE { |
| sf10 | INTEGER(0..9), |
| sf20 | INTEGER(0..19), |
| sf32 | INTEGER(0..31), |
| sf40 | INTEGER(0..39), |
| sf64 | INTEGER(0..63), |
| sf80 | INTEGER(0..79), |
| sf128 | INTEGER(0..127), |
| sf160 | INTEGER(0..159), |
| sf256 | INTEGER(0..255), |
| sf320 | INTEGER(0..319), |
| sf512 | INTEGER(0..511), |
| sf640 | INTEGER(0..639), |
| sf1024 | INTEGER(0..1023), |
| sf1280 | INTEGER(0..1279), |
| sf2048 | INTEGER(0..2047), |
| sf2560 | INTEGER(0..2559) |
| }, | |
| shortDRX | SEQUENCE { |
| shortDRX-Cycle | ENUMERATED { sf2, sf5, sf8, sf10, sf16, sf20, sf32, sf40, sf64, sf80, sf128, sf160, sf256, sf320, sf512, sf640), |
| drxShortCycleTimer | INTEGER (1..16) |
| } OPTIONAL | -- Need OR | drx-InactivityTimer is a timer for DRX, with a value in number of PDCCH sub-frames*number of PDCCH repetitions. Value psf1 corresponds to 1 PDCCH sub-frame* number of PDCCH repetitions, psf2 corresponds to 2 PDCCH sub-frames*number of PDCCH repetitions, and so on.

drx-RetransmissionTimer is a timer for DRX, with a value in number of PDCCH sub-frames*number of PDCCH repetitions. Value psf1 corresponds to 1 PDCCH sub-frame*number of PDCCH repetitions, psf2 corresponds to 2 PDCCH sub-frames*number of PDCCH repetitions, and so on. In case drx-RetransmissionTimer-v1130 is signalled, UE ignores drx-RetransmissionTimer (i.e. without a suffix).

onDurationTimer is a timer for DRX, with a value in number of PDCCH sub-frames*number of PDCCH repetitions. Value psf1 corresponds to 1 PDCCH sub-frame*number of PDCCH repetitions, psf2 corresponds to 2 PDCCH sub-frames*number of PDCCH repetitions, and so on.

The value of longDRX-CycleStartOffsetlongDRX-Cycle (longDRX-Cycle) is in number of sub-frames. Value sf10 corresponds to 10*number of PDCCH repetitions sub-frames, sf20 corresponds to 20*number of PDCCH repetitions sub-frames, and so on. If shortDRX-Cycle is configured, the value of longDRX-Cycle is a multiple of the shortDRX-Cycle value.

The value of drxStartOffset is in number of sub-frames. In case longDRX-CycleStartOffset-v1130 is signalled, UE ignores longDRX-CycleStartOffset (i.e. without suffix).

shortDRX-Cycle has a value in number of sub-frames. Value sf2 corresponds to 2*number of PDCCH repetitions sub-frames, sf5 corresponds to 5*number of PDCCH repetitions sub-frames, and so on. In case shortDRXCycle-v1130 is signalled, UE ignores shortDRX-Cycle (i.e. without a suffix).

drx-Inactivity-Timer specifies the number of consecutive PDCCHsubframe(s) for which UE is to be in active state after successfully decoding PDCCH indicating a new transmission (UL or DL). For supporting coverage enhancement upon receiving PDCCH for a new transmission (UL or DL), drxInactivity-Timer is restarted after PDSCH repetitions scheduled by M-PDCCH.

Similarly for RAR window, the contention resolution timer may be modified as follows:

mac-ContentionResolutionTimer is a timer for contention resolution, with a value in sub-frames*number of repetitions of the CE level. Value sf8 corresponds to 8 sub-frames*number of repetitions of the CE level, sf16 corresponds to 16 sub-frames*number of repetitions of the CE level, and so on.

ra-ResponseWindowSize is the duration of the RA response window, with a value in sub-frames*number of repetitions of the CE level. Value sf2 corresponds to 2 sub-frames*number of repetitions of the CE level, sf3 corresponds to 3 sub-frames*number of repetitions of the CE level, and so on. The same value applies for each serving cell (although the associated functionality is performed independently for each cell).

The number of repetitions may be replaced by the weight factor associated with a specific coverage-enhanced coverage requirement predefined or signalled between UE and eNB, i.e. the value may be defined in sub-frames*weight factor of the CE level.

An embodiment ensures DL reception and UL transmission work properly for the coverage enhancement. The maximum alignment between the DRX configuration and the M-PDCCH transmission enables achieving the optimal UE power saving.

Thus, in an embodiment, a terminal device of a cellular communication system, may define a configuration of at least one channel monitoring related timer such that the effective value of the channel monitoring related timer is mapped to a coverage enhancement level. The terminal device may perform monitoring of channel sub-frames transmitted between a network element and the terminal device, according to said configuration of the channel monitoring related timer.

In an embodiment, a network element may define for a terminal device, a configuration of at least one channel monitoring related timer such that the effective value of the channel monitoring related timer is mapped to a coverage enhancement level, and cause transmission of signalling

```
RACH-ConfigCommon ::=       SEQUENCE {
    preambleInfo                SEQUENCE {
        numberOfRA-Preambles        ENUMERATED {
                                        n4, n8, n12, n16, n20, n24, n28,
                                        n32, n36, n40, n44, n48, n52, n56,
                                        n60, n64},
        preamblesGroupAConfig       SEQUENCE {
            sizeOfRA-PreamblesGroupA    ENUMERATED {
                                            n4, n8, n12, n16, n20, n24, n28,
                                            n32, n36, n40, n44, n48, n52, n56,
                                            n60},
            messageSizeGroupA           ENUMERATED {b56, b144, b208, b256},
            messagePowerOffsetGroupB    ENUMERATED {
                                            minusinfinity, dB0, dB5, dB8, dB10,
dB12,
                                            dB15, dB18},
        ...
        }                           OPTIONAL          -- Need OP
    },
    powerRampingParameters      PowerRampingParameters,
    ra-SupervisionInfo          SEQUENCE {
        preambleTransMax            PreambleTransMax,
        ra-ResponseWindowSize       ENUMERATED {
                                        sf2, sf3, sf4, sf5, sf6, sf7,
                                        sf8, sf10},
        mac-ContentionResolutionTimer   ENUMERATED {
                                            sf8, sf16, sf24, sf32, sf40, sf48,
                                            sf56, sf64}
    },
    maxHARQ-Msg3Tx              INTEGER (1..8),
    ...
}
``` from the network element to the terminal device, the signalling indicating the defined configuration of the channel monitoring related timer.

In an embodiment, a terminal device may acquire from a network element, signalling indicating a configuration of at least one channel monitoring related timer such that the effective value of the channel monitoring related timer is mapped to a coverage enhancement level. The terminal device may perform monitoring of channel sub-frames transmitted between the network element and the terminal device, according to said configuration of the channel monitoring related timer.

Figure 7:
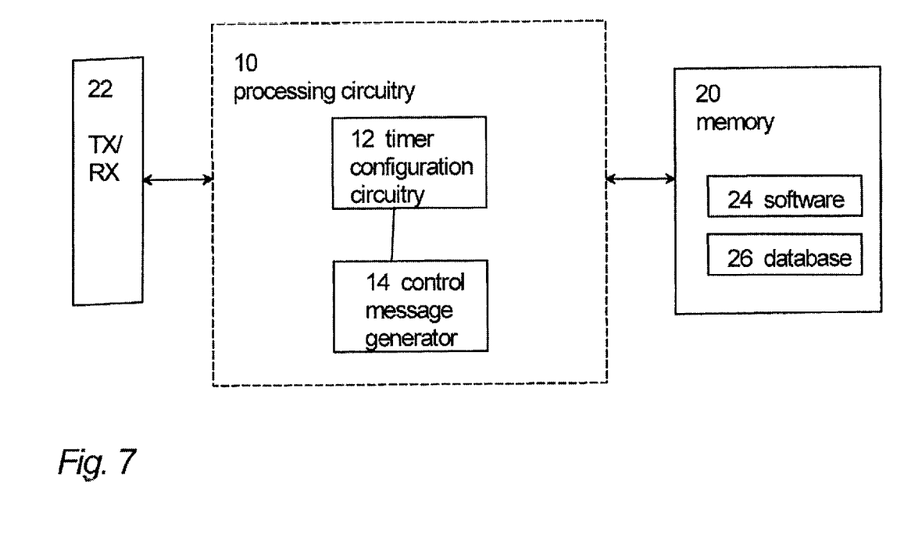
FIGS. 7 and 8 illustrate blocks diagrams of apparatuses according to some embodiments of the invention.

An embodiment provides an apparatus comprising at least one processor and at least one memory including a computer program code, wherein the at least one memory and the computer program code are configured, with the at least one processor, to cause the apparatus to carry out the procedures of the above-described network element or network node. The at least one processor, the at least one memory, and the computer program code may thus be considered as an embodiment of means for executing the above-described procedures of the network element or the network node. FIG. 7 illustrates a block diagram of a structure of such an apparatus. The apparatus may be comprised in the network element or in the network node, e.g. the apparatus may form a chipset or a circuitry in the network element or in the network node. In some embodiments, the apparatus is the network element or the network node. The apparatus comprises a processing circuitry comprising the at least one processor. The processing circuitry 10 may comprise a timer configuration circuitry 12 configured to define for a terminal device, a configuration of at least one downlink control channel monitoring related timer such that the effective value of the downlink control channel monitoring related timer is mapped to a coverage enhancement level. The timer configuration circuitry 12 may be configured to define the configuration of the downlink control channel monitoring related timer, as described above, and output information on the configuration of the downlink control channel monitoring related timer to a control message generator 14 configured to create and transmit signalling to the terminal device, the signalling indicating the defined configuration of the downlink control channel monitoring related timer.

The processing circuitry 10 may comprise the circuitries 12 and 14 as sub-circuitries, or they may be considered as computer program modules executed by the same physical processing circuitry. The memory 20 may store one or more computer program products 24 comprising program instructions that specify the operation of the circuitries 12 and 14. The memory 20 may further store a database 26 comprising definitions for downlink control channel signalling, for example. The apparatus may further comprise a radio interface (not shown in FIG. 7) providing the apparatus with radio communication capability with the terminal devices. The radio interface may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the radio interface may be connected to a remote radio head comprising at least an antenna and, in some embodiments, radio frequency signal processing in a remote location with respect to the base station. In such embodiments, the radio interface may carry out only some of radio frequency signal processing or no radio frequency signal processing at all. The connection between the radio interface and the remote radio head may be an analogue connection or a digital connection. In some embodiments, the radio interface may comprise a fixed communication circuitry enabling wired communications.

Figure 8:
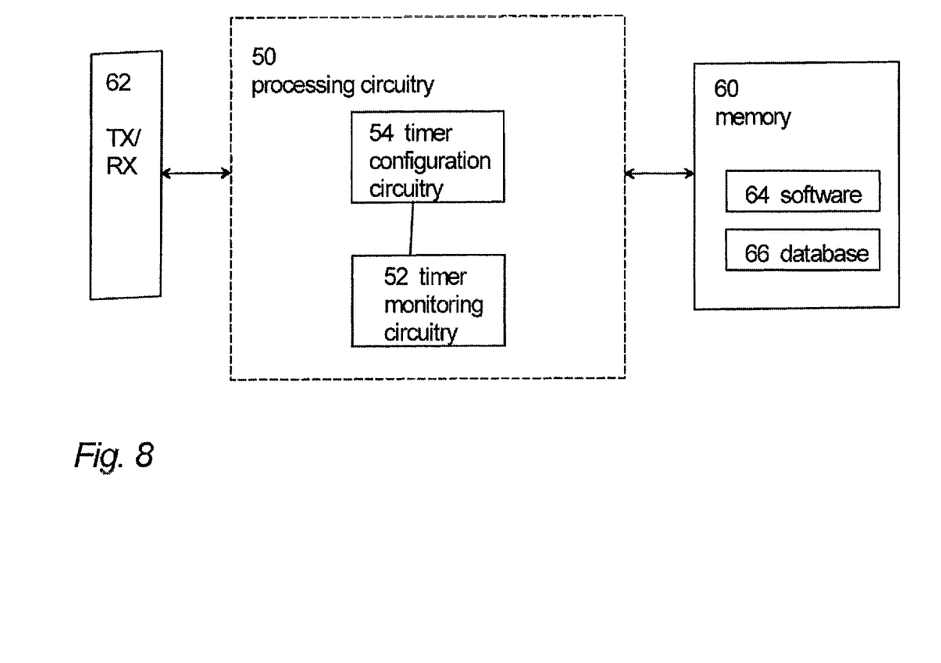

An embodiment provides an apparatus comprising at least one processor and at least one memory including a computer program code, wherein the at least one memory and the computer program code are configured, with the at least one processor, to cause the apparatus to carry out the procedures of the above-described terminal device. The at least one processor, the at least one memory, and the computer program code may thus be considered as an embodiment of means for executing the above-described procedures of the terminal device. FIG. 8 illustrates a block diagram of a structure of such an apparatus. The apparatus may be comprised in the terminal device, e.g. the apparatus may form a chipset or a circuitry in terminal device. In some embodiments, the apparatus is the terminal device. The apparatus comprises a processing circuitry 50 comprising the at least one processor. The processing circuitry 50 may comprise timer configuration circuitry 54 configured to define or acquire a configuration of at least one downlink control channel monitoring related timer such that the effective value of the downlink control channel monitoring related timer is mapped to a coverage enhancement CE level. The notification event detector 52 may be configured to define/acquire the configuration of the downlink control channel monitoring related timer, as described above, and output information on the configuration of the downlink control channel monitoring related timer to a timer monitoring circuitry 52 configured to perform monitoring of downlink control channel sub-frames transmitted from a network element, according to said configuration of the downlink control channel monitoring related timer.

The processing circuitry 50 may comprise the circuitries 52 to 54 as sub-circuitries, or they may be considered as computer program modules executed by the same physical processing circuitry. The memory 60 may store one or more computer program products 64 comprising program instructions that specify the operation of the circuitries 52 to 54. The memory 20 may further store a database 66 comprising definitions for CE level calculation, for example. The apparatus may further comprise a radio interface (not shown in FIG. 8) providing the apparatus with radio communication capability with the terminal devices. The radio interface may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the radio interface may be connected to a remote radio head comprising at least an antenna and, in some embodiments, radio frequency signal processing in a remote location with respect to the base station. In such embodiments, the radio interface may carry out only some of radio frequency signal processing or no radio frequency signal processing at all. The connection between the radio interface and the remote radio head may be an analogue connection or a digital connection. In some embodiments, the radio interface may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 8 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation project partner
DL downlink
DRX discontinuous reception
eNB enhanced node-B
EPDCCH enhanced physical downlink control channel
M-PDCCH MTC PDCCH
LTE long term evolution
MTC machine type communication
PDCCH physical downlink control channel
PDSCH physical downlink sharing channel
SFN system frame number
UL uplink
UE user equipment
HARQ hybrid automatic repeat request
RRC radio resource control
MAC media access control
RAR radio access response
PHR power headroom report
BSR buffer status report
SR scheduling request
FDD frequency division duplex
PRB physical resource block
RACH random access channel

What is claimed is:

1. A method comprising:
acquiring, in a terminal device from a network element of a cellular communication system, signalling indicating a configuration of at least one channel monitoring related timer such that an effective value of the channel monitoring related timer is mapped to a coverage enhancement level; and
performing, in the terminal device, monitoring of channel sub-frames transmitted between the network element and the terminal device, according to said configuration of the channel monitoring related timer;
wherein the channel monitoring related timer and channel sub-frame transmission are aligned such that the sub-frame number of a channel transmission starting sub-frame is defined based on an equation of:

$$[(SFN*10)+\text{sub-frame number}]\text{modulo}(MP\_R\_Period)=MP\_O\_Offset,$$

where SFN is a system frame number of a frame where the starting sub-frame occurs, MP_R_Period is a channel repetition period or the amount of channel repetitions, and MP_O_Offset is a channel occasion offset from 0 to the maximum MP_R_Period−1.

2. The method of claim 1, wherein the coverage enhancement level is calculated in the terminal device, wherein the coverage enhancement level is associated with the amount of channel repetitions.

3. The method of claim 1, wherein the coverage enhancement level is calculated in the network element and transmitted from the network element to the terminal device.

4. The method of claim 1, wherein predefined weight factors associated with each coverage enhancement level are utilized in the terminal device for defining the configuration of the channel monitoring related timer.

5. The method of claim 4, wherein the channel monitoring related timer is extended by multiplying with the predefined weight factor associated with the coverage enhancement level, by adding new parameter values, or by scaling an original parameter value to the number of channel repetitions.

6. The method of claim 1, wherein predefined weight factors associated with each coverage enhancement level are signalled from the network element to the terminal device to be utilized for defining the configuration of the channel monitoring related timer.

7. The method of claim 1, wherein the channel monitoring related timer comprises one or more of a DRX timer, onDurationTimer, RAR window, contention resolution timer, mac-Contention ResolutionTimer, ra-ResponseWindowSize, longDRX-CycleStartOffsetlongDRX-Cycle, drxStartOffset, shortDRX-Cycle, drx-InactivityTimer and drx-RetransmissionTimer.

8. The method of claim 1, wherein said channel comprises at least one of a physical downlink control channel PDCCH, MTC physical downlink control channel M-PDCCH, enhanced physical downlink control channel E-PDCCH, a physical uplink control channel PUCCH, MTC physical uplink control channel M-PUCCH or enhanced physical uplink control channel E-PUCCH.

9. An apparatus comprising
at least one processor; and
at least one non-transitory memory including a computer program code, wherein the at least one memory and the computer program code are configured, with the at least one processor, to cause the apparatus to
define for a terminal device of a communications system, a configuration of at least one channel monitoring related timer such that an effective value of the channel monitoring related timer is mapped to a coverage enhancement level; and
cause transmission of signalling to the terminal device, the signalling indicating the defined configuration of the channel monitoring related timer;
wherein the channel monitoring related timer and a channel sub-frame transmission are aligned such that the sub-frame number of a channel transmission starting sub-frame is defined based on an equation of:

[(SFN*10)+sub-frame number]modulo(*MP_R_Period*)=*MP_O_*Offset, where SFN is a system frame number of a frame where the starting sub-frame occurs, MP_R_Period is a channel repetition period or the amount of channel repetitions, and MP_O_Offset is a channel occasion offset from 0 to the maximum MP_R_Period−1.

10. An apparatus comprising
at least one processor; and
at least one non-transitory memory including a computer program code, wherein the at least one memory and the computer program code are configured, with the at least one processor, to cause the apparatus to
acquire, from a network element of a cellular communication system, signalling indicating a configuration of at least one channel monitoring related timer such that an effective value of the channel monitoring related timer is mapped to a coverage enhancement level; and
perform monitoring of channel sub-frames transmitted between the network element and a user terminal, according to said configuration of the channel monitoring related timer;
wherein the channel monitoring related timer and channel sub-frame transmission are aligned such that the sub-frame number of a channel transmission starting sub-frame is defined based on an equation of:

[(SFN*10)+sub-frame number]modulo(*MP_R_Period*)=*MP_O_*Offset, where SFN is a system frame number of a frame where the starting sub-frame occurs, MP_R_Period is a channel repetition period or the amount of channel repetitions, and MP_O_Offset is a channel occasion offset from 0 to the maximum MP_R_Period−1.

11. The apparatus of claim 10, wherein the coverage enhancement level is calculated in the terminal device, wherein the coverage enhancement level is associated with the amount of channel repetitions.

12. The apparatus of claim 10, wherein the coverage enhancement level is calculated in the network element and transmitted from the network element to the terminal device.

13. The apparatus of claim 10, wherein predefined weight factors associated with each coverage enhancement level are utilized in the terminal device for defining the configuration of the channel monitoring related timer.

14. The apparatus of claim 13, wherein the channel monitoring related timer is extended by multiplying with the predefined weight factor associated with the coverage enhancement level, by adding new parameter values, or by scaling an original parameter value to the number of channel repetitions.

15. The apparatus of claim 10, wherein predefined weight factors associated with each coverage enhancement level are signalled from the network element to the terminal device to be utilized for defining the configuration of the channel monitoring related timer.

16. The apparatus of claim 10, wherein the channel monitoring related timer comprises one or more of a DRX timer, onDurationTimer, RAR window, contention resolution timer, mac-ContentionResolutionTimer, ra-ResponseWindowSize, longDRX-CycleStartOffsetlongDRX-Cycle, drx-StartOffset, shortDRX-Cycle, drx-InactivityTimer and drx-RetransmissionTimer.

17. The apparatus of claim 10, wherein said channel comprises at least one of a physical downlink control channel PDCCH, MTC physical downlink control channel M-PDCCH, enhanced physical downlink control channel E-PDCCH, a physical uplink control channel PUCCH, MTC physical uplink control channel M-PUCCH or enhanced physical uplink control channel E-PUCCH.

\* \* \* \* \*